US009715406B2

United States Patent
Teixeira et al.

(10) Patent No.: US 9,715,406 B2
(45) Date of Patent: Jul. 25, 2017

(54) ASSIGNING AND SCHEDULING THREADS FOR MULTIPLE PRIORITIZED QUEUES

(71) Applicant: Microsoft Corporation, Redmond, WA (US)

(72) Inventors: Pedro Teixeira, Redmond, WA (US); Arun Kishan, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 504 days.

(21) Appl. No.: 13/918,749

(22) Filed: Jun. 14, 2013

(65) Prior Publication Data

US 2014/0373021 A1    Dec. 18, 2014

(51) Int. Cl.
G06F 9/46      (2006.01)
G06F 9/48      (2006.01)
G06F 9/50      (2006.01)

(52) U.S. Cl.
CPC .......... G06F 9/4881 (2013.01); G06F 9/5038 (2013.01)

(58) Field of Classification Search
None
See application file for complete search history.

(56) References Cited

U.S. PATENT DOCUMENTS 5,826,081 A * 10/1998 Zolnowsky .......... G06F 9/4843 718/102
6,223,207 B1    4/2001 Lucovsky et al.
6,411,982 B2 *  6/2002 Williams ................ 718/102
6,477,561 B1 * 11/2002 Robsman ............. G06F 9/5083 718/102
7,080,379 B2    7/2006 Brenner et al.
7,657,892 B2    2/2010 Langen et al.
8,387,057 B2    2/2013 Wilmarth
8,954,968 B1 *  2/2015 Pohl ................... G06F 11/3409 718/100
2004/0250026 A1 * 12/2004 Tanoue ................ G06F 3/061 711/151

(Continued)

OTHER PUBLICATIONS

Chintala, et al., "Implementing Thread Priorities in a HTTP Server", Retrieved at <<http://www.cs.nyu.edu/18lerner/spring11/proj_priorities.pdf>>, Retrieved date: May 1, 2013, pp. 8.

(Continued)

*Primary Examiner* — Sisley Kim

(57) ABSTRACT

An operating system provides a pool of worker threads servicing multiple queues of requests at different priority levels. A concurrency controller limits the number of currently executing threads. The system tracks the number of currently executing threads above each priority level, and preempts operations of lower priority worker threads in favor of higher priority worker threads. A system can have multiple pools of worker threads, with each pool having its own priority queues and concurrency controller. A thread also can change its priority mid-operation. If a thread becomes lower priority and is currently active, then steps are taken to ensure priority inversion does not occur. In particular, the current thread for the now lower priority item can be preempted by a thread for a higher priority item and the preempted item is placed in the lower priority queue.

26 Claims, 7 Drawing Sheets

(56) References Cited

U.S. PATENT DOCUMENTS

2010/0050178 A1    2/2010    Levitan et al.
2012/0151063 A1*  6/2012    Yang ..................... G06F 9/5011
                                                                   709/226

OTHER PUBLICATIONS

Black, David L., "Scheduling Support for Concurrency and Parallelism in the Mach Operating System", Retrieved at <<http://repository.cmu.edu/cgi/viewcontent.cgi?article=2949&context=compsci&sei-redir=1&referer=http%3A%2F%2Fscholar.google.co.in%2Fscholar%3Fhl%3Den%26as_sdt%3D0%2C5%26q%3D%28priority%2Bthread%29%28Queue%29%28%29#search=%22%28priority%20thread%29%28Queue%29%28%29%22>>, In Journals of IEEE Computer, vol. 23, Issue 5, Jan. 1, 1990, pp. 20.

Bollella, et al., "The Real-Time Specification for Java", Retrieved at <<http://ieeexplore.ieee.org/xpls/abs_all.jsp?arnumber=846318, In Journals of IEEE Computer, vol. 33, Issue 6, Jun. 2000, pp. 8.

Ciurca, Ruslan, "Scalable Servers with IO Completion Ports and How to Cook Them", Retrieved at <<http://www.codeproject.com/Articles/20570/Scalable-Servers-with-IO-Completion-Ports-and-How>>, Sep. 19, 2007, pp. 19.

"IO Completion Ports", Retrieved at <<http://msdn.microsoft.com/en-us/library/windows/desktop/aa365198(v=vs.85).aspx>>, Oct. 4, 2011, pp. 5.

"Office Action Issued in European Patent Application No. 13771339.2", Mailed Date: Sep. 15, 2016, 3 Pages.

Loyall, et al., "Dynamic Policy-Driven Quality of Service in Service-Oriented Systems", In Proceedings of the 13th IEEE International Symposium on Object/Component/Service-Oriented Real-Time Distributed Computing, May 5, 2010, 9 Pages.

"International Search Report and Written Opinion Issued in PCT Application No. PCT/US2013/061086", Mailed Date: Nov. 26, 2013, 9 Pages.

\* cited by examiner

ASSIGNING AND SCHEDULING THREADS FOR MULTIPLE PRIORITIZED QUEUES

BACKGROUND

In modern computing systems, it is common to have an operating system that allows computer programs to be executed as multiple threads which share access to computing resources managed by the operating system. An operating system itself also can have multiple threads available for servicing requests from applications to operating system resources, herein called worker threads.

There are several ways to manage the complexity of multiple applications competing for resources. Generally, a queue is provided to manage requests from applications to use worker threads, such as a request to use a thread to access a resource. If all requests are treated equally, then a first-to-arrive request is assigned to a worker thread first. In some instances, some requests have a higher priority than others. In such a case, separate queues of requests are used for each priority level, and each priority level has its own pool of worker threads. A scheduler assigns threads to requests in queues based on time of arrival, and manages shared access to resources by multiple threads by making threads active and blocking or preempting threads based on priority.

With such a system, each worker thread has a fixed priority, and cannot change priority during execution; otherwise there is a risk of priority inversions. Also, with a pool of worker threads for each priority level, the number of priority levels is limited by system resources. Finally, such a system can experience dependency deadlocks.

SUMMARY

This Summary introduces selected concepts in simplified form that are further described below in the Detailed Description. This Summary is intended neither to identify key or essential features of the claimed subject matter, nor to limit the scope of the claimed subject matter.

An operating system provides a pool of worker threads servicing multiple queues of requests at different priority levels. A concurrency controller limits the number of concurrently executing, i.e., active, worker threads. The operating system tracks the number of concurrently executing threads above each priority level, and preempts operations of lower priority worker threads in favor of higher priority worker threads. A system can have multiple pools of worker threads, with each pool having its own priority queues and concurrency controller.

The concurrency controller incorporates a scheduler. Thus, a thread also can change its priority mid-operation by directly informing the scheduler. If a thread becomes lower priority and is currently active, then steps are taken to ensure priority inversion does not occur. In particular, the scheduler can preempt an active worker thread at a now lower priority in favor of a higher priority worker thread.

In the following description, reference is made to the accompanying drawings which form a part hereof, and in which are shown, by way of illustration, specific example implementations of this technique. It is understood that other embodiments may be utilized and structural changes may be made without departing from the scope of the disclosure.

DETAILED DESCRIPTION

The following section describes an example computer system on which an operating system that assigns and schedules worker threads to items from multiple prioritized queues can be implemented.

The following description is intended to provide a brief, general description of a suitable computer with which such a system can be implemented. The computer can be any of a variety of general purpose or special purpose computing hardware configurations. Examples of well-known computers that may be suitable include, but are not limited to, personal computers, server computers, hand-held or laptop devices (for example, media players, notebook computers, tablet computers, cellular phones, personal data assistants, voice recorders), multiprocessor systems, microprocessor-based systems, set top boxes, game consoles, programmable consumer electronics, network PCs, minicomputers, mainframe computers, distributed computing environments that include any of the above systems or devices, and the like.

Figure 1:
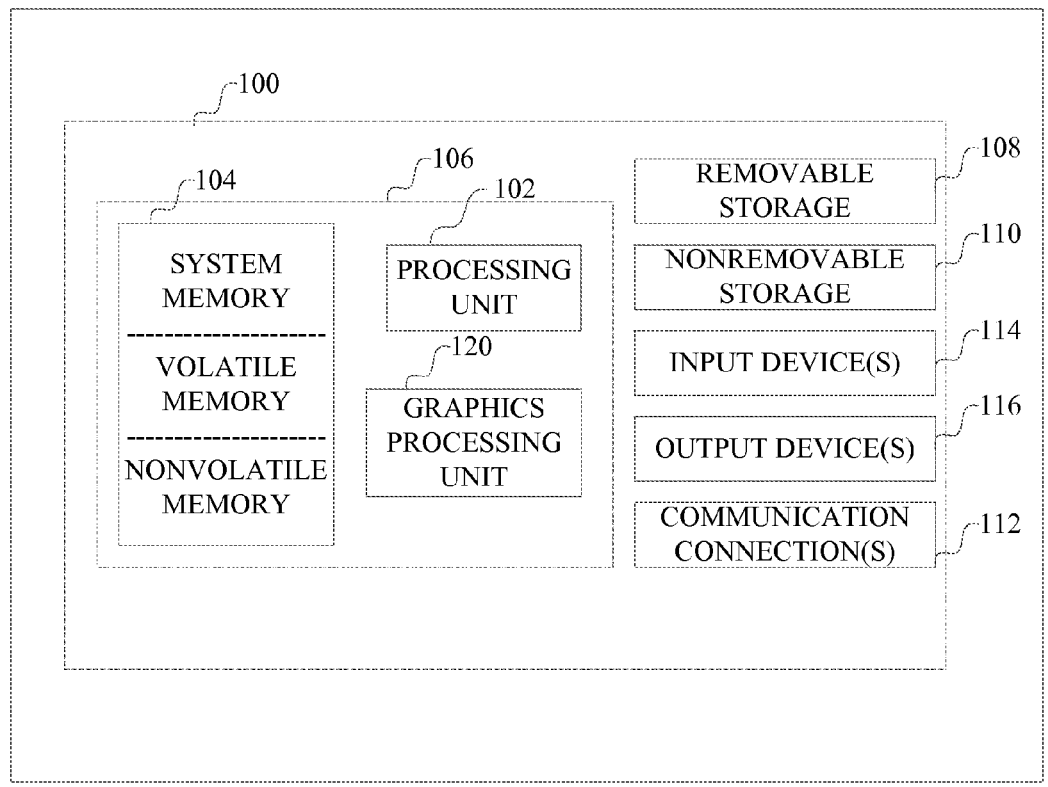
FIG. 1 is a block diagram of an example computer with which components of such a system can be implemented.

FIG. 1 illustrates an example of a suitable computer. This is only one example of a suitable computer and is not intended to suggest any limitation as to the scope of use or functionality of such a computer.

With reference to FIG. 1, an example computer 100, in a basic configuration, includes at least one processing unit 102 and memory 104. The computer may include multiple processing units and/or additional co-processing units such as graphics processing unit 120. Depending on the exact configuration and type of computer, memory 104 may be volatile (such as RAM), non-volatile (such as ROM, flash memory, etc.) or some combination of the two. This configuration is illustrated in FIG. 1 by dashed line 106.

Additionally, computer 100 may also have additional features/functionality. For example, computer 100 may also include additional storage (removable and/or non-removable) including, but not limited to, magnetic or optical disks or tape. Such additional storage is illustrated in FIG. 1 by removable storage 108 and non-removable storage 110. Computer storage media includes volatile and nonvolatile, removable and non-removable media implemented in any method or technology for storage of information such as computer program instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by computer 100. Any such computer storage media may be part of computer 100.

Computer 100 may also contain communications connection(s) 112 that allow the device to communicate with other devices over a communication medium. Communication media typically carry computer program instructions, data structures, program modules or other data in a modulated data signal such as a carrier wave or other transport mechanism and include any information delivery media. The term "modulated data signal" means a signal that has one or more of its characteristics set or changed in such a manner as to encode information in the signal, thereby changing the configuration or state of the receiving device of the signal. By way of example, and not limitation, communication media includes wired media such as a wired network or direct-wired connection, and wireless media such as acoustic, RF, infrared and other wireless media. Communications connections 112 are devices that interface with the communication media to transmit data over and receive data from communication media, such as a network interface.

Computer 100 may have various input device(s) 114 such as a keyboard, mouse, pen, camera, touch input device, and so on. Output device(s) 116 such as a display, speakers, a printer, and so on may also be included. All of these devices are well known in the art and need not be discussed at length here. Various input and output devices can implement a natural user interface (NUI), which is any interface technology that enables a user to interact with a device in a "natural" manner, free from artificial constraints imposed by input devices such as mice, keyboards, remote controls, and the like.

Examples of NUI methods include those relying on speech recognition, touch and stylus recognition, gesture recognition both on screen and adjacent to the screen, air gestures, head and eye tracking, voice and speech, vision, touch, gestures, and machine intelligence, and may include the use of touch sensitive displays, voice and speech recognition, intention and goal understanding, motion gesture detection using depth cameras (such as stereoscopic camera systems, infrared camera systems, and other camera systems and combinations of these), motion gesture detection using accelerometers or gyroscopes, facial recognition, three dimensional displays, head, eye, and gaze tracking, immersive augmented reality and virtual reality systems, all of which provide a more natural interface, as well as technologies for sensing brain activity using electric field sensing electrodes (EEG and related methods).

Each component of this system that operates on a computer generally is implemented by software, such as one or more computer programs, which include computer-executable instructions and/or computer-interpreted instructions, such as program modules, being processed by the computer. Generally, program modules include routines, programs, objects, components, data structures, and so on, that, when processed by a processing unit, instruct the processing unit to perform particular tasks or implement particular abstract data types. This computer system may be practiced in distributed computing environments where tasks are performed by remote processing devices that are linked through a communications network. In a distributed computing environment, program modules may be located in both local and remote computer storage media including memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Figure 2:
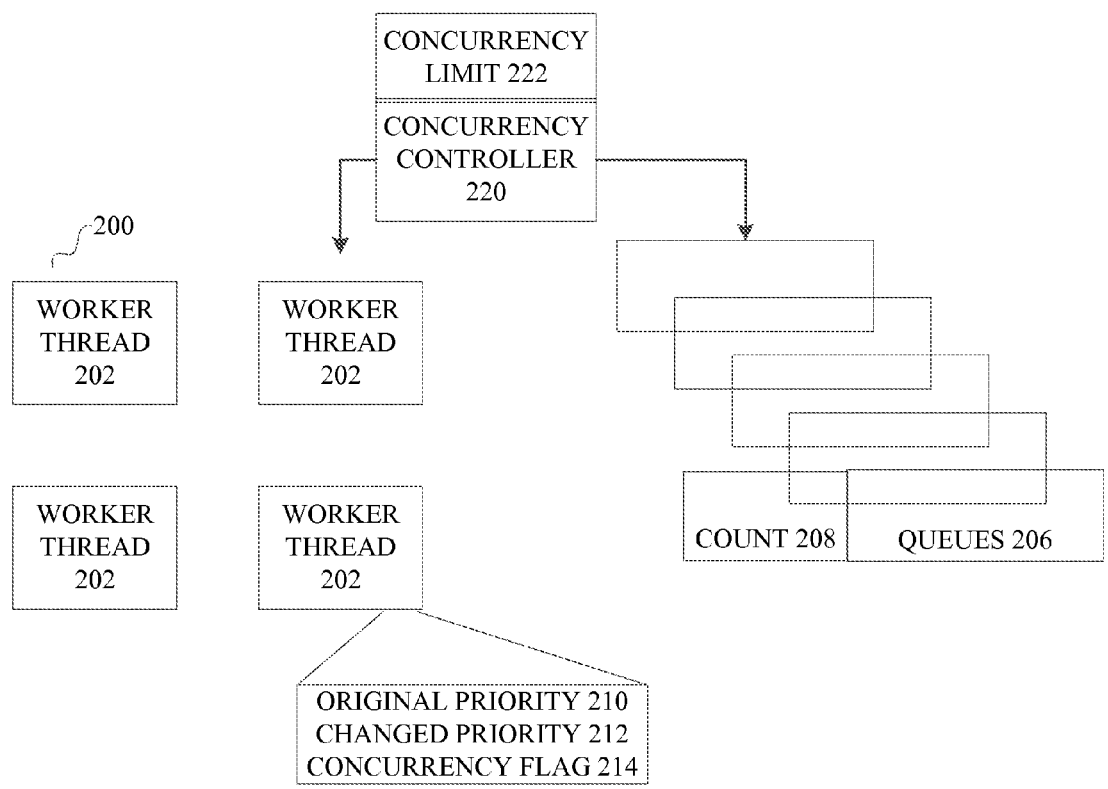
FIG. 2 is a diagram illustrating an example implementation of multiple queues of different priorities for a pool of worker threads managed by an operating system for a computer system.

Having now described a computer, an operating system is a computer program executed on the computer that manages access to resources of the computer by other applications. One way in which an operating system provides access to such resources is through a pool 200 of worker threads 202, such as shown in FIG. 2. The worker threads 202 represent instances of a computer program that can be invoked to access resources of the operating system. Such resources can include, but are not limited to, input devices, output devices, storage devices, processor time and the like.

An application uses an application programming interface of the operating system to perform various tasks related to such a pool, such as, but not limited to, to request such a pool, to specify work items to be processed by the pool, and to change the priority of work items being processed by the pool.

In one implementation, the pool of available worker threads is managed using a last-in, first-out (LIFO) queue, or stack. By using such an implementation, threads that have waited the least amount of time are assigned work first, to optimize the likelihood of cache hits on the data structures related to the thread.

To manage use of such a pool of worker threads, the pool has an associated set of queues 206 of items. Each item in a queue represents a request from an application for work to be performed by the worker threads. Each queue has an associated priority level, with each priority level having an associated queue. Different queues have different priority levels. In one example implementation, for each queue 206, or for each priority level, the system maintains a thread count 208 indicating the number of worker threads assigned to items at the same priority level as the queue. The queue can be implemented in a variety of ways, but to cause requests with earlier arrival times to be processed first, each queue is implemented as a form of first-in, first-out (FIFO) queue.

As described in more detail below, a concurrency controller 220 for the pool assigns items in the queue to worker threads while limiting the number of concurrently active worker threads. To perform this function, the concurrency controller maintains a limit 222 of the number of worker threads that can be concurrently active, i.e., accessing an operating system resource. The concurrency controller ensures that the number of active worker threads does not exceed the concurrency limit. As an example an operating system can set a concurrency limit based on the number of processors, such that the number of working threads does not oversubscribe the central processing unit. This example implements a "batch" mode of processing in which worker threads run until completion, instead of being time multiplexed with other threads in the system.

Each worker thread includes data indicating its priority 210 at the time it was assigned to an item, any changed priority 212 in the event that the thread priority can be changed, and a concurrency flag 214, indicating whether this thread is charged against the concurrency limit, to be used if thread priorities can be changed. Any blocked thread is not charged to the concurrency count for its priority level. A preempted thread remains charged to the thread count or concurrency count for its priority level.

Given the structures described above, a concurrency controller can manage the assignment of each new request to a worker thread while maintaining a concurrency limit. The concurrency controller also integrates a scheduler that manages concurrent access by the active worker threads to the system resources. Using the additional data for each thread indicating changed priority 212 and the concurrency flag 214, the concurrency controller can manage scheduling active worker threads as priorities of threads change.

An example implementation of a concurrency controller that manages adding new requests to the queue, changing priorities of items and threads, and assigning worker threads to items in the prioritized queues, will now be described in connection with FIGS. 3-6.

Figure 3:
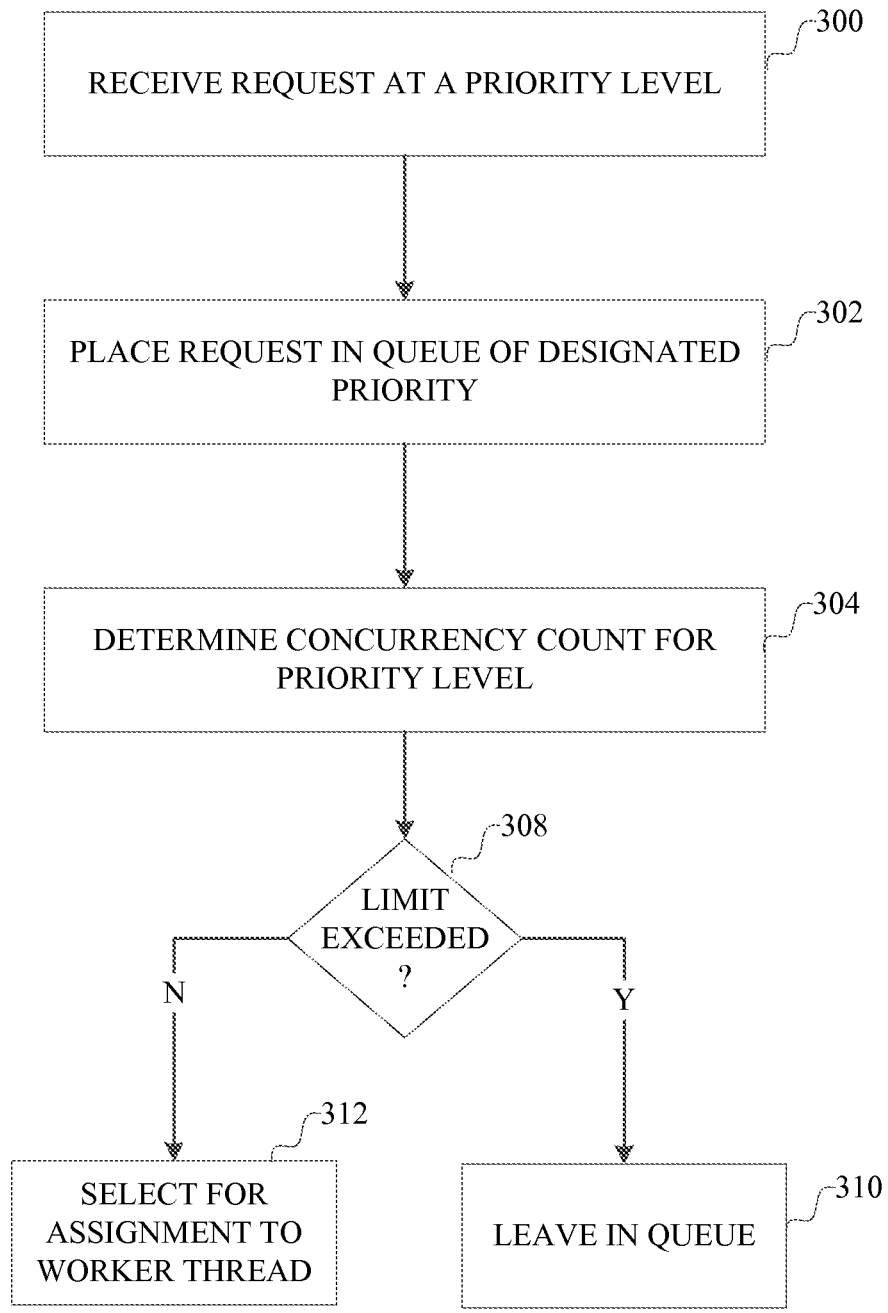
FIG. 3 is a flow chart of an example implementation of adding an item to a queue.

In FIG. 3, an example implementation of a concurrency controller will now be described, in connection with the operation of adding an item to a prioritized queue for a pool of worker threads. This description assumes that the pool of worker threads has already been created and information about the pool has been provided to an application, so that the application can access the pool using an application programming interface. After the application has access to the pool, one of the commands it can request is to submit a request that a worker thread in the pool perform some specified work at a specified priority level. The specification of the priority level can be inferred from the context, e.g., the priority level of the application, or the nature of the resource request, or can be specified by the application.

After an application submits such a request, the operating system receives 300 the request and its priority level. The request is placed 302 in the queue for the specified priority level.

It is next determined whether this request can be serviced. If the new request is not the next unassigned item in its queue, it is not serviced until after the previous item(s) in that queue is/are completed, within the concurrency limit. The concurrency controller determines 306 the concurrency count for the priority level of the new request. This concurrency count is the number of active worker threads at the priority level of the queue into which the request was added, and higher priority levels.

For example, if there are two worker threads at priority level five, and one worker thread at priority level four, then the concurrency count for priority level four is three and the concurrency count for priority level five is two.

If the concurrency limit is exceeded by the concurrency count for the priority level of the new item, as determined at 308, then the new item is merely added 310 to the queue, otherwise it is selected 312 for immediate assignment to a worker thread. Assignment of an item to a worker thread will be described in more detail in connection with FIG. 6. The count (e.g., 208 in FIG. 2) of worker threads at that priority level is updated when an item is assigned to a worker thread, when a worker thread completes, when worker thread is blocked, when the priority of the worker thread is changed.

Figure 4:
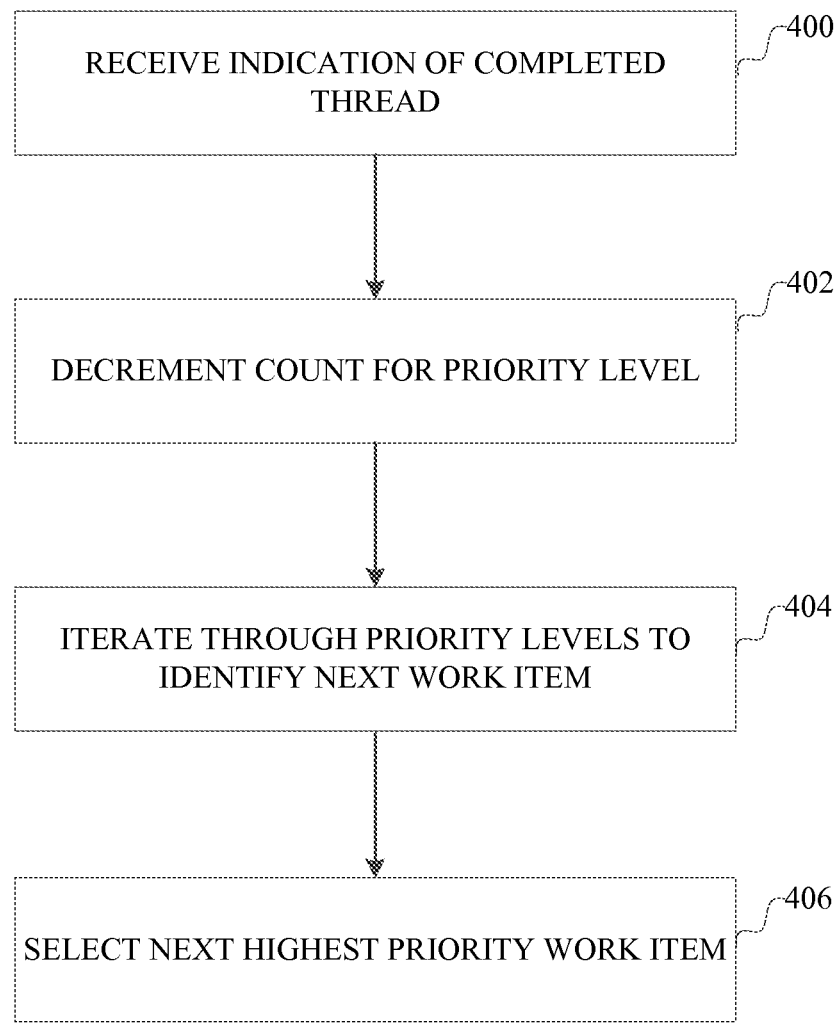
FIG. 4 is a flow chart of an example implementation of selecting an item after a worker thread completes.

Referring to FIG. 4, another time at which a concurrency controller may assign a worker thread to an item from the prioritized queues is when another worker thread completes. The concurrency controller receives 400 an indication that the worker thread has completed. The thread count for the priority level of that worker thread can be decremented 402. So long as the concurrency count for a priority level is less than the concurrency limit, the concurrency controller iterates 404 through any inactive threads and queues of items, highest priority first, to identify the highest priority level with either an inactive thread or at least one item in its queue. It selects 406 the next item of highest priority If this item is in the queue, it is assigned to a worker thread which is made active; if the item is already assigned a worker thread, that worker thread is made active. Inactive threads are selected over queued items at the same priority level. Thus, a preempted thread is scheduled when the concurrency limit has not yet been reached and no higher priority thread can be run, and no equal priority threads exist ahead of the thread. Thus, as long as a thread is preempted, the queues cannot release any item for assignment to a worker thread at the same priority level or below that of the preempted thread. Assignment of an item to a worker thread is described in more detail in connection with FIG. 6.

Figure 5:
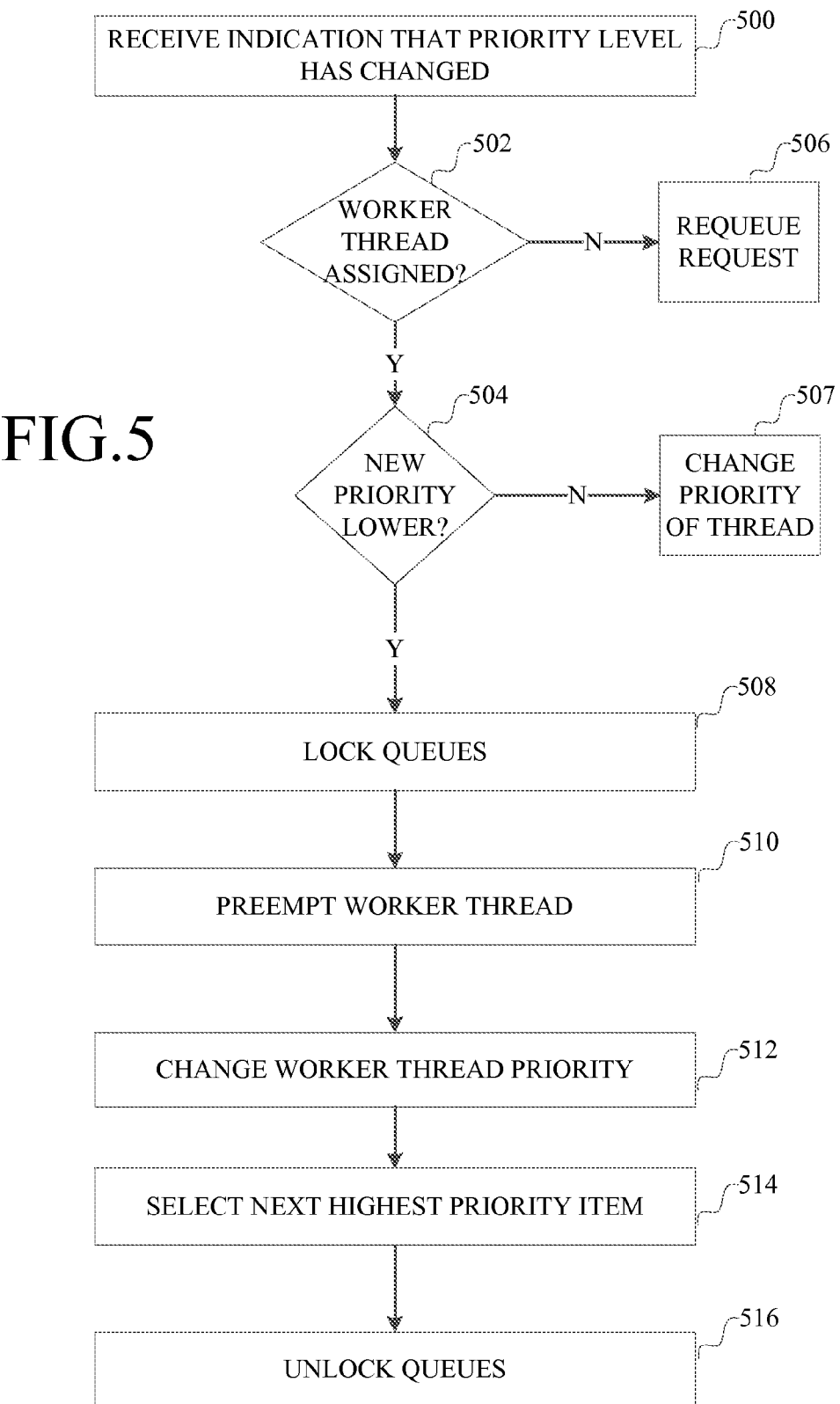
FIG. 5 is a flow chart of an example implementation of changing priority of a thread.

Referring now to FIG. 5, another event that affects the queued items and worker threads is when priority of an item or worker thread changes. For example, an application can attempt to change the priority of a request, which can involve changing the item in the queue or changing the priority of a worker thread to which an item is assigned. Such a change is performed through the concurrency controller that integrates the scheduler, so that the priority of the worker thread is changed directly through the scheduler. When the priority of an item in the queue changes, it is removed from the queue for its original priority level and then added to the queue for its new priority level. If the priority for the item or a worker thread becomes higher, then the impact on the system is minimal. The priority of the item in the queue or the worker thread can simply be changed. An item can be removed from a lower priority queue and placed in another higher priority queue; a worker thread's priority can be changed to be higher in the scheduler.

However, if an item is already assigned to a worker thread, and its priority becomes lower, there is a risk of a priority inversion occurring in which a lower priority thread prevents a higher priority thread, assigned to a work item from a higher priority queue, from running due. In particular, a priority inversion occurs if a lower priority thread is prevented from running, e.g., by yet another thread of intermediate priority, and the higher priority thread is prevented from running due to the lower priority thread.

An example implementation of managing a priority change will now be described in FIG. 5. Given the conditions that can result in a priority inversion, the concurrency controller, receives 500 an indication that an item's priority level has changed. For example, through an application programming interface, an application can inform the concurrency controller of a change in priority. If the item has not been assigned to a worker thread, i.e., the item is still in a queue, as determined at 502, then the item can be queued 506 in the queue for the new priority level and treated as a new request (see FIG. 3). If the item is already assigned to a worker thread, yet the new priority is higher, as determined at 504, then the priority of the worker thread can simply be changed in the scheduler. The thread count and concurrency count for each priority level can be updated. Otherwise, if priority is decreasing and this item is already assigned to a worker thread, then additional steps are taken to preempt the now lower priority request to allow a thread of higher priority to be made active, which can include assigning a request from a higher priority queue to a worker thread.

To assign a higher priority request to a worker thread or allow a thread of higher priority to be made active, the concurrency controller first locks 508 the queues to enable a change to be made without interference. The worker thread assigned to the item with the changed priority is preempted 510. The thread count for the previous priority level, and corresponding concurrency count, are decremented. The thread count and concurrency count for the new priority level is incremented. The thread's priority is set 512 to the new priority level. The concurrency controller then selects 514 the next item of highest priority, by either activating a thread of higher priority or selecting an item that has not yet been assigned a worker thread. Such assignment is described in more detail below in connection with FIG. 6. After a worker thread for the next highest priority item is active, the queue data is updated, the lock on the queue can be released 516.

As noted above, an item can be assigned to a worker thread when it is the next highest priority item in the queues and if the concurrency count for its priority level does not exceed the current concurrency limit. This assignment can occur, for example, when an item is added to a queue, when a worker thread completes an item, and when the priority of a worker thread changes.

Figure 6:
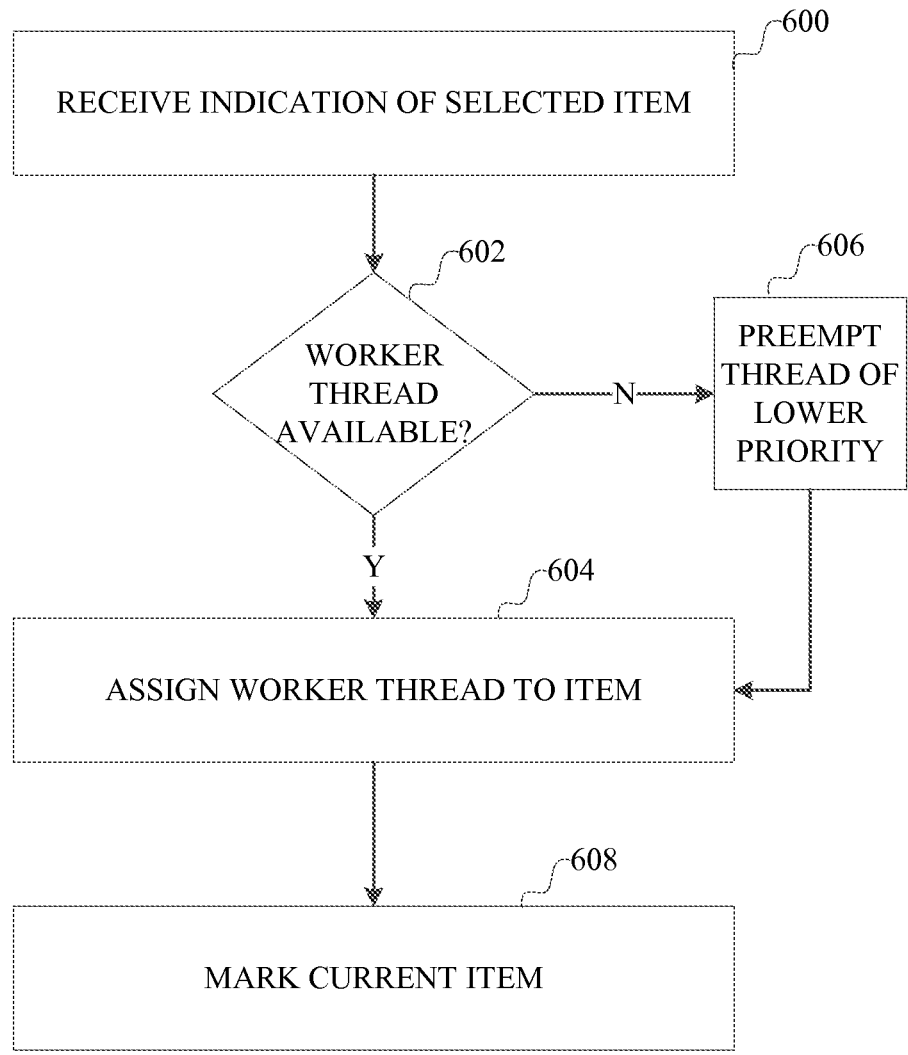
FIG. 6 is a flow chart of an example implementation of assigning a worker thread to a selected item from a queue.

An example implementation of assigning an item to a worker thread will now be described in connection with FIG. 6.

The concurrency controller receives 600 an indication of the next selected item to be assigned to a worker thread. This step can be the same step as described above where the concurrency controller selects the next item. It is then determined, at 602, whether a worker thread is available from the pool. In some instances, a worker thread is expected to be available, such as when the controller selects an item after another worker thread completes. In others, there may be one or more worker threads, of lower priority than the current item, of which one is preempted if a resource is not available. If a worker thread is available, it is assigned 604 to the current item. If a worker thread is not available, a worker thread of lower priority is selected and preempted 606. The current item is then assigned 604 to a now available worker thread. When an item is assigned a worker thread the thread can be marked 608 as contributing to the concurrency limit and the thread count for that priority level can be incremented.

When the worker thread is assigned, it is given the priority of the item to which it is assigned. As noted above, if this priority is changed, the concurrency controller can manage that change due to the fact that the scheduler is integrated with the concurrency controller, such that the priority is set as part of the scheduling operation, and thus the schedule is informed directly of any priority change.

With worker threads assigned to items from the prioritized queue, the scheduler residing in the concurrency controller then can schedule concurrent operation of the active worker threads.

With such an implementation, a single pool of worker threads can be assigned to process work items at multiple different priorities. The concurrency controller can ensure that the most recently received, highest priority items are assigned to worker threads first. Further, priority of threads and/or items in the queue can change during operation, and a scheduler integrated in the concurrency controller can manage worker thread assignment to reduce the likelihood of priority inversion.

Figure 7:
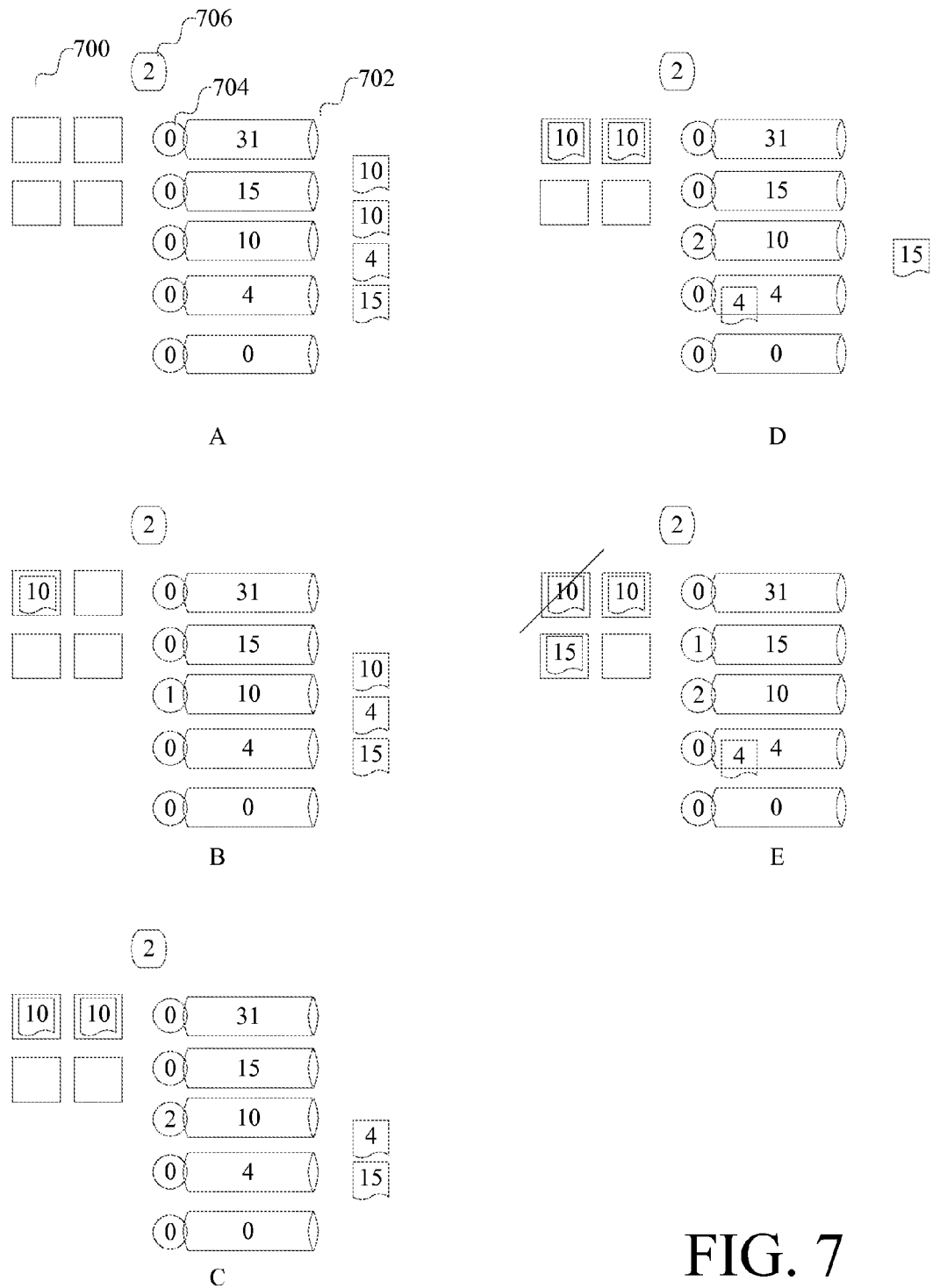
FIG. 7 is a diagram of an illustrative example of concurrency control in operation.

An illustrative example of such a system at work is illustrated in FIG. 7. In FIG. 7, a pool of worker threads 700, priority queues 702 with a thread count 704, and concurrency limit ("2") are shown. Each of the priority queues has a priority, in this example, 0, 4, 10, 15 and 31, respectively. A sequence of work items about to be queued is illustrated at 704. As shown at "A", all queues are empty. Next, as shown at "B", a work item of priority 10 is added to the queue for priority 10. This work item is assigned to a worker thread with priority 10 and the thread count for the priority 10 queue is incremented. As shown at "C", a second work item of priority 10 is added to the queue for priority 10. This work item is assigned a worker thread with priority 10 and the thread count for the priority 10 queue is incremented to "2". As shown at "D", a next item has priority 4 and is added to the queue of priority 4. Because the concurrency limit is "2", and the thread count for all queues having a priority higher than four is already "2" (due to the two items at priority 10), the item is not assigned a worker thread. Next, shown at "E", a work item of priority 15 is added to its corresponding queue. The sum of all thread counts at priority level 15 and above is less than the concurrency limit. Thus this item is immediately assigned a worker thread, and that thread is set to have priority 15. If the machine only has two computational resources available, then the global scheduler preempts one of the threads running at priority 10 to allow the thread at priority 15 to run.

It is also possible to provide an implementation of guaranteed worker thread queuing, which ensures, at the time the work item is queued, that a worker thread will be available to service a work item. One condition that allows the guarantee to be made is that the number of waiting working thread is greater than the number of work items ahead of the new item in the prioritized queues. Because an item of higher priority can arrive after an item has been queued, a mechanism is provided to account for such an occurrence. In one implementation, each work item that has a guarantee is marked. When an item is added to the queue with a guarantee, a counter is incremented; when that item is assigned a worker thread, the counter is decremented. When a new item of higher priority is added to the queue, it is not assigned a worker thread if there is a lower priority item with a guarantee. Such an implementation is helpful in a system that can experience heavy loads and can eliminate replicating worker thread logic that is otherwise used to provide dedicated threads to guarantee performance.

Having now described example implementations and variants, it should be apparent that any or all of the aforementioned alternate implementations described herein may be used in any combination desired to form additional hybrid implementations. It should be understood that the subject matter defined in the appended claims is not necessarily limited to the specific implementations described above. The specific implementations described above are disclosed as examples only.

What is claimed is:

1. A computer comprising:
    a memory and at least one processing unit;
    an operating system executing on the at least one processing unit, wherein the operating system is operative to:
    in response to a request from an application executing on the computer, allocate a pool of worker threads for the application, wherein each worker thread is a thread provided by the operating system, and wherein each worker thread services requests from the application to access operating system resources;
    associate a plurality of queues with the pool of worker threads allocated for the application, each queue having a different priority, for storing items to be assigned to the worker threads, each item representing a request, having a priority, from the application to access the operating system resources using one of the worker threads in the pool of worker threads allocated for the application; and
    the operating system further comprising a concurrency controller operative to assign items from the plurality of queues to worker threads while limiting a number of concurrently executing worker threads;

wherein, in response to a request, having a priority, from the application to access the operating system resources, the concurrency controller is operative to:

add an item corresponding to the request to the queue having the priority of the request, and determine whether a concurrency limit for the queue having the priority of the request is reached based on at least a thread count of concurrently executing worker threads associated with the queue; and in response to a determination that the concurrency limit for the queue having the priority of the request is not reached, assign the item corresponding to the request to one of the worker threads and increment the thread count associated with the queue.

2. The computer of claim 1, wherein the operating system has an application programming interface enabling applications to add items to the queues with specified priorities.

3. The computer of claim 2, wherein each worker thread has a concurrency flag indicating whether the worker thread is counted against the concurrency limit.

4. The computer of claim 3, wherein each worker thread has an indication of an original priority and an indication of any changed priority.

5. The computer of claim 4, wherein in response to a change in priority of a worker thread to a lower priority, the worker thread is preempted and a worker thread of higher priority is made active.

6. The computer of claim 1, wherein the concurrency controller marks an item as having a guarantee that a worker thread will be available to service the item.

7. The computer of claim 1, wherein the concurrency controller, in response to addition of an item to the queue of a higher priority than a current worker thread, preempts the current worker thread and assigns the item of higher priority to a worker thread.

8. The computer of claim 1, wherein the concurrency controller, to determine whether a concurrency limit for the queue is reached, is further operative to compare the thread counts for the queues having a priority at and higher than the priority of the request to a concurrency limit.

9. The computer of claim 1, wherein the concurrency controller assigns items to worker threads within the concurrency limit for each queue according to highest priority items and then arrival time of the items.

10. An article of manufacture comprising:

a memory or storage device;

computer program instructions stored on the memory or storage device which, when read from the memory or storage device and processed by a processing unit of a computer, instruct the processing unit to be configured to have an operating system executing on the at least one processing unit, wherein the operating system is operative to:

in response to a request from an application executing on the computer, allocate a pool of worker threads for the application, wherein each worker thread is a thread provided by the operating system, and wherein each worker thread services requests from the application to access operating system resources;

associate a plurality of queues with the pool of worker threads allocated for the application, each queue having a different priority, for storing items to be assigned to the worker threads, each item representing a request, having a priority, from the application to access the operating system resources using one of the worker threads in the pool of worker threads allocated for the application; and the operating system further comprising a concurrency controller operative to assign items from the plurality of queues to worker threads while limiting a number of concurrently executing worker threads;

wherein, in response to a request, having a priority, from the application to access the operating system resources, the concurrency controller is operative to:

add an item corresponding to the request to the queue having the priority of the request, and determine whether a concurrency limit for the queue having the priority of the request is reached based on at least a thread count of concurrently executing worker threads associated with the queue; and in response to a determination that the concurrency limit for the queue having the priority of the request is not reached, assign the item corresponding to the request to one of the worker threads and increment the thread count associated with the queue.

11. The article of manufacture of claim 10, wherein the operating system has an application programming interface enabling applications to add items to the queues with specified priorities.

12. The article of manufacture of claim 11, wherein each worker thread has a concurrency flag indicating whether the worker thread counts against the concurrency limit.

13. The article of manufacture of claim 12, wherein each worker thread has an indication of an original priority and an indication of any changed priority.

14. The article of manufacture of claim 13, wherein in response to a change in priority of a worker thread to a lower priority, the worker thread is preempted and a worker thread of higher priority is made active.

15. The article of manufacture of claim 10, wherein the concurrency controller marks an item as having a guarantee that a worker thread will be available to service the item.

16. The article of manufacture of claim 10, wherein the concurrency controller, in response to addition of an item to the queue of a higher priority than a current worker thread, preempts the current worker thread and assigns the item of higher priority to a worker thread.

17. The article of manufacture of claim 10, wherein the concurrency controller, to determine whether a concurrency limit for the queue is reached, is further operative to compare the thread counts for the queues having a priority at and higher than the priority of the request to a concurrency limit.

18. The article of manufacture of claim 10, wherein the concurrency controller assigns items to worker threads within the concurrency limit for each queue according to highest priority items and then arrival time of the items.

19. A computer-implemented process performed by an operating system executing on a computer, the process comprising:

the operating system allocating a pool of worker threads for an application executing on the computer in response to a request from the application, wherein each worker thread is a thread provided by the operating system, wherein each worker thread services requests from the application to access operating system resources; the operating system associating a plurality of queues with the pool of worker threads, each queue for items of different priority, each item representing a request having a priority from the application to access the operating system resources using one of the worker threads in the pool of worker threads allocated to the application, assigning items to the pool of worker threads using a concurrency controller provided by the operating system, while limiting a number of concurrently executing worker threads by, in response to a request from the application including an item having a priority, the concurrency controller:

adding the item to the queue having the priority of the item;

determining whether a concurrency limit for the queue having the priority of the item is reached based on at least a thread count of concurrently executing worker threads associated with the queue; and in response to a determination that the concurrency limit for the queue having the priority of the item is not reached, assigning the item to one of the worker threads and increment the thread count for the queue.

20. The computer-implemented process of claim 19, wherein each worker thread has a concurrency flag indicating whether the worker thread counts against the concurrency limit.

21. The computer-implemented process of claim 20, wherein each worker thread has an indication of an original priority and an indication of any changed priority.

22. The computer-implemented process of claim 21, wherein in response to a change in priority of a worker thread to a lower priority, preempting the worker thread and making a worker thread of higher priority active.

23. The computer-implemented process of claim 19, further comprising marking an item as having a guarantee that a worker thread will be available to service the item.

24. The computer-implemented process of claim 19, wherein the concurrency controller, in response to addition of an item to the queue of a higher priority than a current worker thread, preempts the current worker thread and assigns the item of higher priority to a worker thread.

25. The computer-implemented process of claim 19, wherein the concurrency controller, to determine whether a concurrency limit for the queue is reached, is further operative to compare the thread counts for the queues having a priority at and higher than the priority of the request to a concurrency limit.

26. The computer-implemented process of claim 19, wherein the concurrency controller assigns items to worker threads within the concurrency limit for each queue according to highest priority items and then arrival time of the items.

* * * * *